(12) United States Patent
Conroy et al.

(10) Patent No.: US 7,984,317 B2
(45) Date of Patent: Jul. 19, 2011

(54) HARDWARE-BASED POWER MANAGEMENT OF FUNCTIONAL BLOCKS

(75) Inventors: David G. Conroy, E. Granada, CA (US); Timothy J. Millet, Mountain View, CA (US); Joseph P. Bratt, San Jose, CA (US)

(73) Assignee: Apple Inc., Cupertino, CA (US)

( * ) Notice: Subject to any disclaimer, the term of this patent is extended or adjusted under 35 U.S.C. 154(b) by 609 days.

(21) Appl. No.: 12/053,807

(22) Filed: Mar. 24, 2008

(65) Prior Publication Data
US 2009/0240959 A1    Sep. 24, 2009

(51) Int. Cl.
G06F 1/28 (2006.01)
(52) U.S. Cl. ........................................ 713/340; 713/324
(58) Field of Classification Search ........... 713/300–340
See application file for complete search history.

(56) References Cited

U.S. PATENT DOCUMENTS

| | | | |
|---|---|---|---|
| 5,714,870 A * | 2/1998 | Dunstan ........................ 713/321 |
| 6,212,645 B1 * | 4/2001 | Tjandrasuwita .............. 713/330 |
| 6,229,553 B1 | 5/2001 | Duluk, Jr. et al. |
| 6,268,875 B1 | 7/2001 | Duluk, Jr. et al. |
| 6,525,737 B1 | 2/2003 | Duluk, Jr. et al. |
| 6,594,771 B1 * | 7/2003 | Koerber et al. ............... 713/330 |
| 6,597,363 B1 | 7/2003 | Duluk, Jr. et al. |
| 6,693,639 B2 | 2/2004 | Duluk, Jr. et al. |
| 6,697,076 B1 | 2/2004 | Trivedi et al. |
| 6,717,576 B1 | 4/2004 | Duluk, Jr. et al. |
| 6,771,264 B1 | 8/2004 | Duluk et al. |
| 6,822,654 B1 | 11/2004 | Trivedi et al. |
| 6,848,032 B2 | 1/2005 | Benkual et al. |
| 6,877,020 B1 | 4/2005 | Bratt et al. |
| 7,015,921 B1 | 3/2006 | Trivedi et al. |
| 7,055,018 B1 | 5/2006 | Bratt et al. |
| 7,114,058 B1 | 9/2006 | Trivedi et al. |
| 7,167,181 B2 | 1/2007 | Duluk, Jr. et al. |
| 7,174,471 B2 * | 2/2007 | Komarla et al. .............. 713/320 |
| 7,305,540 B1 | 12/2007 | Trivedi et al. |
| 7,325,148 B2 * | 1/2008 | Inoue et al. ................... 713/300 |
| 7,383,449 B2 * | 6/2008 | Nokkonen .................... 713/300 |
| 7,395,440 B2 * | 7/2008 | Nokkonen .................... 713/300 |
| 7,430,675 B2 * | 9/2008 | Lee ............................... 713/320 |
| 7,467,287 B1 | 12/2008 | Bratt et al. |
| 7,684,833 B2 * | 3/2010 | Marschalkowski et al. .. 455/574 |
| 7,685,444 B2 * | 3/2010 | Lippojoki ..................... 713/320 |
| 2008/0059782 A1 * | 3/2008 | Kruse et al. ....................... 713/1 |
| 2008/0168289 A1 * | 7/2008 | Noh ............................... 713/323 |
| 2008/0276110 A1 * | 11/2008 | Indiani et al. ................ 713/330 |

* cited by examiner

*Primary Examiner* — Raymond N Phan
(74) *Attorney, Agent, or Firm* — Fletcher Yoder PC

(57) ABSTRACT

A system and method is disclosed for efficiently managing power distribution among the various functional blocks used within portable electronic devices. The method includes allowing each functional block to be independently controlled, containing its own low-level software and power controls for setting the local power state of the functional block. For each power control domain in the implementation, hardware uses these local power states and sets the actual operating state of the power control domain accordingly.

22 Claims, 7 Drawing Sheets

HARDWARE-BASED POWER MANAGEMENT OF FUNCTIONAL BLOCKS

BACKGROUND OF THE INVENTION

1. Field of the Invention

The present invention relates generally to the power management of portable electronic devices and, more specifically, to a system and method for efficiently managing power distribution among the various functional blocks used within portable electronic devices.

2. Description of the Related Art

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Portable electronic devices, such as mp3 players, cellular phones, portable video devices, personal data organizers, and portable laptop computers, for example, are continually providing more features, functions and/or storage capacity despite the fact that the devices are decreasing in size and becoming more portable. Many of these devices are able to achieve the increase in functionality and decreased size thanks to engineering breakthroughs with respect to integrated circuits which make up the electronic devices. Specifically, the integrated circuits are able to be more densely populated with the circuits that operate in the electronic device. Additionally, more efficient techniques for utilizing existing and/or future hardware and software are being developed to allow for increased functionality.

Due in part to these increases in functionality coupled with decreases in size, a common concern with portable electronic devices is power management. In particular, increased functionality typically results in increased power requirements. However, since the devices are generally getting smaller, less room is available for portable batteries within the devices. Therefore, a common problem is insufficient battery life. In addition, increased power requirements may lead to increased temperatures within the devices. Other than advanced thermal dissipation techniques, the best way to address this problem is through efficient power management for the device.

However, many known techniques for minimizing power consumption in portable electronic devices can lead to other problems, such as improperly managing common system resources. This is partially due to the fact that power distribution among various components in portable electronic devices is often managed through low-level software. This software is responsible for not only ascertaining the power requirements of the individual components but also for knowing when components are associated with common resources, like a clock/power system. A fundamental problem with this technique is that these associations are actually based on the physical interconnections of hardware within the device. Therefore, maintaining these associations within low-level software can be cumbersome from a software design standpoint, resulting in inefficiency from a power management standpoint.

SUMMARY

Certain aspects of embodiments disclosed herein by way of example are summarized below. It should be understood that these aspects are presented merely to provide the reader with a brief summary of certain forms an invention disclosed and/or claimed herein might take and that these aspects are not intended to limit the scope of any invention disclosed and/or claimed herein. Indeed, any invention disclosed and/or claimed herein may encompass a variety of aspects that may not be set forth below.

An electronic device utilizing power control management through hardware is provided. The electronic device may contain multiple functional blocks distributed between multiple power control domains. Each functional block may include its own power controls and low-level software for setting a local power state for the functional block. For example, each functional block may have a device driver for determining the power state required by the functional block. However, the actual operating power state for each power control domain may be set using only hardware. For example, the low-level software for each functional block may set a value within a physical power control register associated with the functional block. These physical power control registers may automatically update an arrangement of logical gates which, in turn, may be used to automatically set the operating power state for the associated power control domain. Therefore, the power supplied to the power control domains may be controlled entirely by hardware as opposed to software. By moving these power management functions from software to hardware, the electronic device may avoid several of the power management drawbacks known in the prior art, such as the incorrect setting of power states, the necessity of managing physical coupling relationships within software, and so forth.

BRIEF DESCRIPTION OF THE DRAWINGS

These and other features, aspects, and advantages of the present disclosure may become better understood when the following detailed description of certain exemplary embodiments is read with reference to the accompanying drawings in which like characters represent like parts throughout the drawings, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
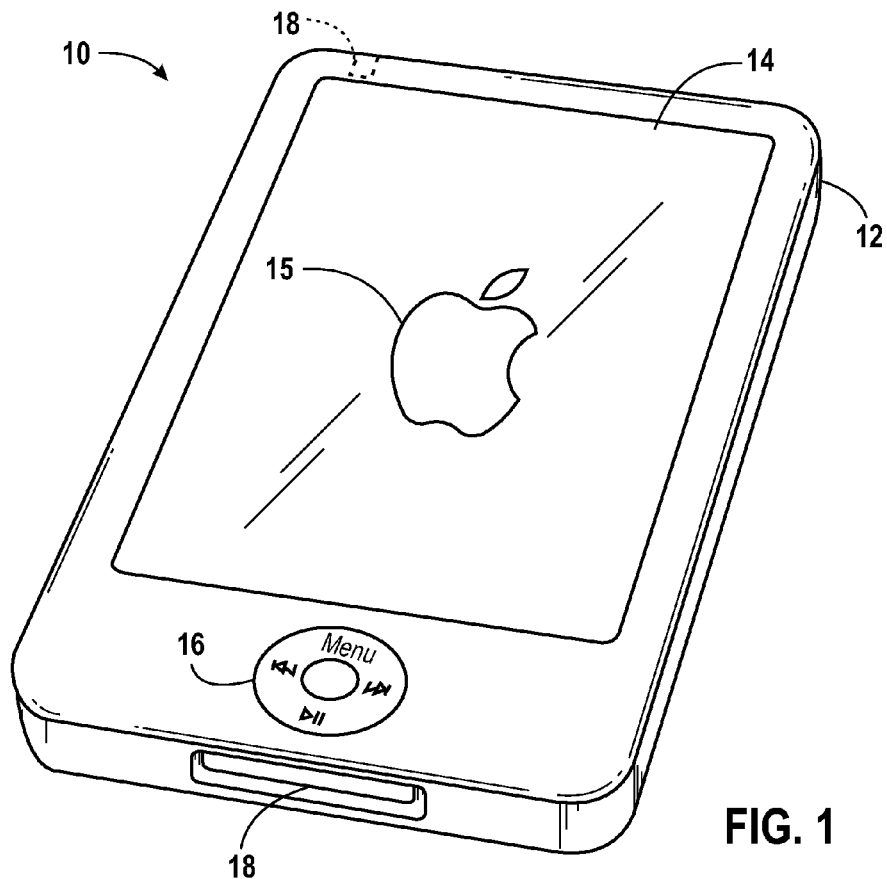
FIG. 1 is a perspective view illustrating an example of an electronic device, such as a portable media player, in accordance with one embodiment of the present disclosure.

An exemplary electronic device 10 is illustrated in FIG. 1 in accordance with one embodiment of the present technique. In some embodiments, including the presently illustrated embodiment, device 10 may be a portable electronic device, such as a media player, a cellular phone, a personal data organizer, or the like. Indeed, in such embodiments, a portable electronic device may include a combination of the functionalities of such devices. In addition, electronic device 10 may allow a user to connect to and communicate through the Internet or through other networks, such as local or wide area networks. For example, electronic device 10 may allow a user to access the internet and to communicate using e-mail, text messaging, instant messaging, or using other forms of electronic communication. By way of example, electronic device 10 may be a model of an iPod® having a display screen or an iPhone® available from Apple Inc.

In certain embodiments, electronic device 10 may be powered by one or more rechargeable and/or replaceable batteries. Such embodiments may be highly portable, allowing a user to carry electronic device 10 while traveling, working, exercising, and so forth. In this manner, and depending on the functionalities provided by electronic device 10, a user may listen to music, play games or video, record video or take pictures, place and receive telephone calls, communicate with others, control other devices (e.g., via remote control and/or Bluetooth functionality), and so forth while moving freely with electronic device 10. In addition, electronic device 10 may be sized such that it fits relatively easily into a pocket or a hand of the user. While certain embodiments of the present disclosure are described with respect to a portable electronic device, it should be noted that the presently disclosed techniques may be applicable to a wide array of other electronic devices and systems.

In the presently illustrated embodiment, exemplary device 10 may include an enclosure or housing 12, a display 14, user input structures 16, and input/output connectors 18. Enclosure 12 may be formed from plastic, metal, composite materials, or other suitable materials, or any combination thereof. Enclosure 12 may protect the interior components of electronic device 10 from physical damage, and may also shield the interior components from electromagnetic interference (EMI).

Display 14 may be a liquid crystal display (LCD), a light emitting diode (LED) based display, an organic light emitting diode (OLED) based display, or some other suitable display. In accordance with certain embodiments of the present technique, display 14 may display a user interface and various other images, such as logos, avatars, photos, album art, and the like. Additionally, in one embodiment, display 14 may include a touch screen through which a user may interact with the user interface. The display may also include various function and/or system indicators to provide feedback to a user, such as power status, call status, memory status, or the like. These indicators may be incorporated into the user interface displayed on display 14.

In one embodiment, one or more of the user input structures 16 may be configured to control electronic device 10, such as by controlling a mode of operation, an output level, an output type, etc. For example, user input structures 16 may include a button to turn electronic device 10 on or off. Further user input structures 16 may allow a user to interact with the user interface on display 14. Embodiments of electronic device 10 may include any number of user input structures 16, including buttons, switches, a control pad, a scroll wheel, or any other suitable input structures. User input structures 16 may work with the user interface displayed on electronic device 10 to control functions of electronic device 10 and/or any interfaces or devices connected to or used by electronic device 10. For example, user input structures 16 may allow a user to navigate a displayed user interface or to return such a displayed user interface to a default or home screen.

Exemplary electronic device 10 may also include various input and output ports 18 to allow connection of additional devices. For example, port 18 may be a headphone jack that provides for the connection of headphones. Additionally, port 18 may have both input/output capabilities to provide for connection of a headset (e.g., a headphone and microphone combination). Embodiments of the present technique may include any number of input and/or output ports, such as headphone and headset jacks, universal serial bus (USB) ports, IEEE-1394 ports, and AC and/or DC power connectors. Further, electronic device 10 may use the input and output ports 18 to connect to and send or receive data with any other device, such as other portable electronic devices, personal computers, printers, or the like. For example, in one embodiment, electronic device 10 may connect to a personal computer via an IEEE-1394 connection to send and receive data files, such as media files.

Figure 2:
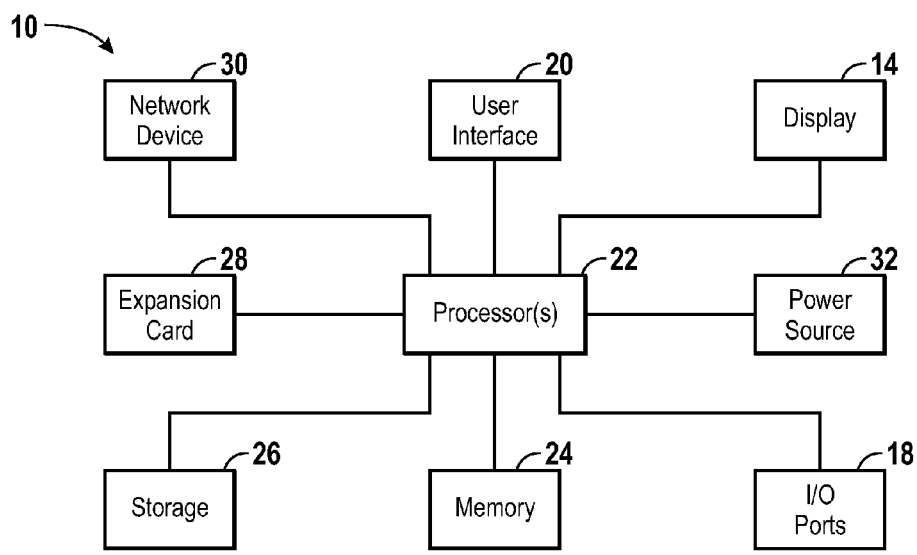
FIG. 2 is a simplified block diagram of the electronic device of FIG. 1 in accordance with one embodiment of the present disclosure.

Additional details of illustrative electronic device 10 may be better understood through reference to FIG. 2, which is a block diagram illustrating various components and features of electronic device 10 in accordance with one embodiment. In the presently illustrated embodiment, electronic device 10 may include display 14 and I/O ports 18 discussed above. In addition, as discussed in greater detail below, exemplary electronic device 10 may include a user interface 20, one or more processors 22, a memory device 24, a non-volatile storage 26, card interface(s) 28, a networking device 30, and a power source 32.

As discussed further herein, user interface 20 may be displayed on display 14, and may provide a means for a user to interact with electronic device 10. User interface 20 may be a textual user interface, a graphical user interface (GUI), or any combination thereof, and may include various layers, windows, screens, templates, elements, or other components that may be displayed in all or in part of display 14. User interface 20 may, in certain embodiments, allow a user to interface with displayed interface elements via one or more user input structures 16 and/or via a touch sensitive implementation of display 14. In such embodiments, the user interface may provide interactive functionality, allowing a user to select, by touch screen or other input structure, from among options displayed on display 14. Thus the user can operate electronic device 10 by appropriate interaction with user interface 20.

Processor(s) 22 may provide the processing capability needed to execute the operating system, programs, user interface 20, and any other functions of electronic device 10. Processor(s) 22 may include one or more microprocessors, such as one or more "general-purpose" microprocessors, one or more special-purpose microprocessors and/or ASICS, or some combination thereof. For example, processor 22 may include one or more reduced instruction set (RISC) processors, as well as graphics processors, video processors, and/or related chip sets.

As noted above, embodiments of electronic device 10 may also include memory 24. Memory 24 may include a volatile memory, such as random access memory (RAM), and/or a non-volatile memory, such as read-only memory (ROM). Memory 24 may store a variety of information and may be used for various purposes. For example, memory 24 may store the firmware for electronic device 10, such as an operating system, other programs that enable various functions of electronic device 10, user interface functions, processor functions, and may be used for buffering or caching during operation of electronic device 10.

Non-volatile storage 26 of electronic device 10 of the presently illustrated embodiment may include ROM, flash memory, a hard drive, or any other suitable optical, magnetic, or solid-state storage medium, or a combination thereof. Storage 26 may store data files such as media (e.g., music and video files), software (e.g., for implementing functions on electronic device 10), preference information (e.g., media playback preferences), lifestyle information (e.g., food preferences), exercise information (e.g., information obtained by exercise monitoring equipment), transaction information (e.g., information such as credit card information), wireless connection information (e.g., information that may enable electronic device 10 to establish a wireless connection, such as a telephone connection), subscription information (e.g., information that maintains a record of podcasts, television shows, or other media to which a user subscribes), telephone information (e.g., telephone numbers), and any other suitable data.

The embodiment illustrated in FIG. 2 may also include one or more card slots 28. Card slots 28 may be configured to receive expansion cards that may be used to add functionality to electronic device 10, such as additional memory, I/O functionality, or networking capability. Such an expansion card may connect to the device through any type of suitable connector, and may be accessed internally or external to housing 12. For example, in one embodiment, the card may be a flash memory card, such as a SecureDigital (SD) card, mini- or microSD, CompactFlash card, Multimedia card (MMC), or the like. Additionally, in an embodiment including mobile telephone functionality, card slots 28 may receive a Subscriber Identity Module (SIM) card.

Exemplary electronic device 10 depicted in FIG. 2 may also include network device 30, such as a network controller or a network interface card (NIC). In one embodiment, network device 30 may be a wireless NIC providing wireless connectivity over any 802.11 standard or any other suitable wireless networking standard. Network device 30 may allow electronic device 10 to communicate over a network, such as a LAN, WAN, MAN, or the Internet. Further, electronic device 10 may connect to and send or receive data with any device on the network, such as portable electronic devices, personal computers, printers, and so forth. For example, in one embodiment, electronic device 10 may connect to a personal computer via network device 30 to send and receive data files, such as media files. Alternatively, in some embodiments, the portable electronic device may not include network device 30. In such an embodiment, a NIC may be added into card slot 28 to provide similar networking capability as described above.

Further, electronic device 10 may also include power source 32. In one embodiment, power source 32 may be one or more batteries, such as a Li-Ion battery, may be user-removable or secured to housing 12, and may or may not be rechargeable. Additionally, power source 32 may utilize AC power, such as provided by an electrical outlet, and electronic device 10 may be connected to power source 32 via I/O ports 18.

As discussed above, processor(s) 22, memory 24 and non-volatile storage 26 may provide processing capability and long-term and short-term storage that allow for a plurality of programs and functions to be executed by electronic device 10. These programs and functions may include audio, video, and voice/chat subsystems as well as numerous other general purpose subsystems. The processing may be carried out by one or more microprocessors on one or more chip sets. Therefore, electronic device 10 may comprise a plurality of functional blocks of associated programs and/or functions. As will be appreciated, in some instances a functional block may include related programs or functions while in other instances a functional block may include disparate or otherwise unrelated programs or functions.

At any given time, numerous, but not necessarily all, functional blocks may be in use. As a simple example, the video, audio, and voice/chat subsystems may be the only functional blocks active at any given time. In addition, each subsystem may have varying power needs. One way of dealing with this situation may be to have low-level software that serves as the device driver for a functional block to put the block into a low-power state when the block is not being used and return the block to a high-power state when the block is needed. The details of the "low power" and "high power" states may be device-specific but may typically involve some combination of clock speed (full speed, reduced speed, or stopped) and voltage to the functional block (max voltage, reduced voltage, or zero voltage).

Figure 3A:
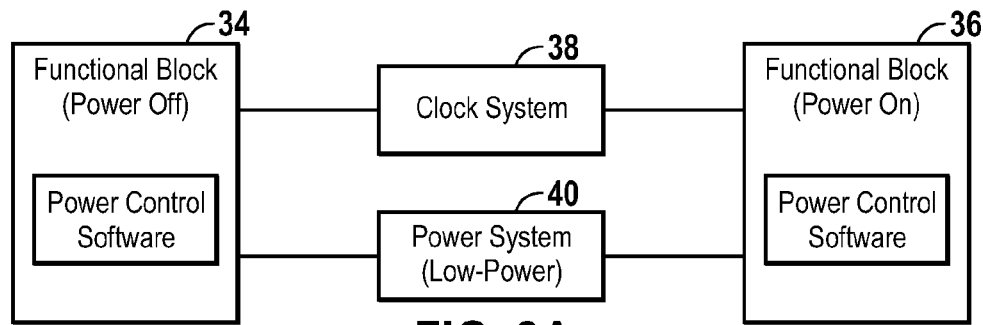
FIGS. 3A & 3B are block diagrams illustrating problems associated with power distribution techniques known in the prior art.
Figure 3B:
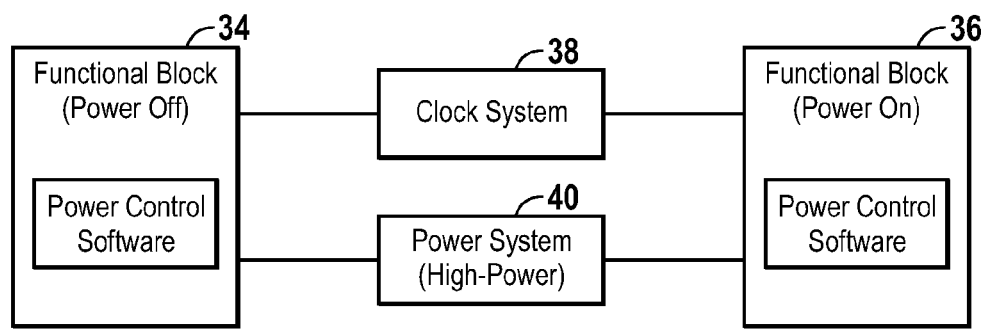

Although this technique works well in certain circumstances, it can also present problems. For example, the functional blocks may be coupled in some way by the implementation. An example of this could be a group of functional blocks 34 and 36 that share a clock system 38, a power system 40, or both as illustrated in FIGS. 3A & 3B. If this type of sharing occurs, the power control software must be aware of the coupling. Otherwise, several different types of problems may arise. For example, as illustrated in FIG. 3A, the power control software could put first functional block 34 into a low-power state because it is not being used and, as a side effect, also put second functional block 36 into a low-power state when second functional block 36 is actively being used. This may adversely affect the functionality of second functional block 36 because second functional block 36 might have no power to accomplish the functions that were currently being performed. Conversely, as illustrated in FIG. 3B, the power control software could possibly leave both functional blocks 34 and 36 in a high-power state merely because second functional block 36 is being used. This may lead to more power being used than necessary because the first functional block might be receiving power even though no functions were currently being performed.

Figure 4:
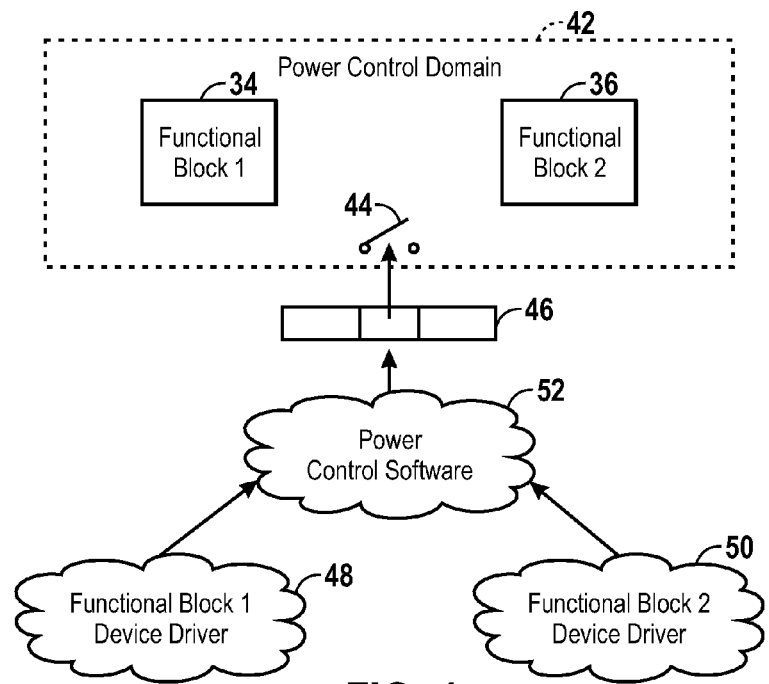
FIG. 4 is a diagram illustrating a system associated with power distribution techniques known in the prior art.

FIG. 4 more particularly illustrates this problem situation. As shown, first and second functional blocks 34, 36 may be situated within a power control domain 42. Within power control domain 42, a power control switch 44 may be used to toggle the power on or off for power control domain 42. This toggling may be carried out by a physical power control register 46 which can, for example, have a binary bit set to a 1 or 0 based on whether the power is to be on or off for power control domain 42. As discussed above, in this type of configuration, software may be used to control the toggling of power control switch 44 for power control domain 42. For example, a device driver 48 for first functional block 34 and a device driver 50 for second functional block 36 may both set the power control state of their respective functional blocks. Device drivers 48, 50 may accomplish this by executing software functions which communicate with power control software 52. Power control software 52 may, in turn, update physical power control register 46 by setting the appropriate binary bit to a 1 or 0 depending on whether power control domain 42 currently requires power.

Figure 5:
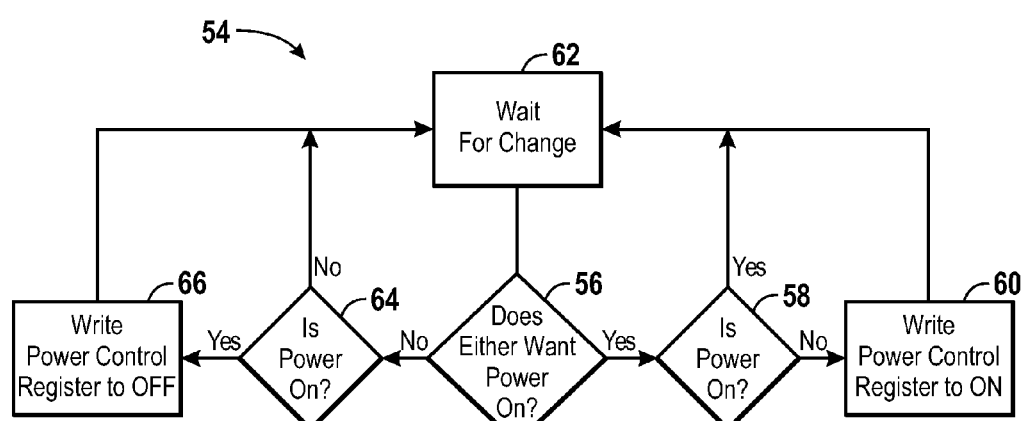
FIG. 5 is a flow chart of a method for updating power states associated with power distribution techniques known in the prior art.

FIG. 5 illustrates a simplified flow diagram of a process 54 that may be taken to update the power states using power control software 52 with this configuration. Device drivers 48, 50 for each functional block 34, 36 may determine whether their respective functional block needs power and call an appropriate function with power control software 52 (block 56). If a call is made to turn the power on, power control software 52 may determine whether physical power control register 46, and therefore power control switch 44, is already currently set to an ON state for power control domain 42 (block 58). If physical power control register 46 is not already set to an ON state for power control domain 42, power control software 52 may update the binary bit of physical power control register 46 relating to power control domain 42 to an ON state (block 60). Otherwise, if physical power control register 46 is already set to an ON state for the power control domain 42, power control software 52 may simply wait for another change in state to be initiated by either of device drivers 48, 50 of functional blocks 34, 36 (block 62).

Conversely, if a call is made to turn the power off, power control software 52 may determine whether physical power control register 46, and therefore power control switch 44, is already currently set to an OFF state for power control domain 42 (block 64). If physical power control register 46 is not already set to an OFF state, power control software 52 may update the binary bit of physical power control register 46 relating to power control domain 42 to an OFF state (block 66). Otherwise, if physical power control register 46 is already set to an OFF state for power control domain 42, power control software 52 again may simply wait for another change in state to be initiated by either of device drivers 48, 50 of functional blocks 34, 36 (block 62).

In the configurations discussed above, only two functional blocks 34, 36 are shown within each power control domain 42. However, those skilled in the art will appreciate that each power control domain 42 may actually contain any number of functional blocks. As such, power control software 52 may manage numerous functional blocks at any given time. The actual number of functional blocks managed by power control software 52 can be based on device-specific implementations. Nevertheless, the software (e.g., functional block device drivers 48, 50 and power control software 52) may be required to keep track of the coupling relationships between the functional blocks in order to adequately manage the power requirements of all the functional blocks within each power control domain 42.

The coupling between the functional blocks may be difficult for power control software to manage for several reasons. For example, the coupling may usually be related to power control device-specific implementation issues. Therefore, requiring the power control software to manage these couplings may necessitate updating the software with the device-specific intricacies every time a new design is implemented. Furthermore, managing the couplings with the power control software may scatter the implementation-specific software code across several power control parts of the device's software. This may further exacerbate the problem of adequately organizing the implementation-specific intricacies for each device.

Figure 6:
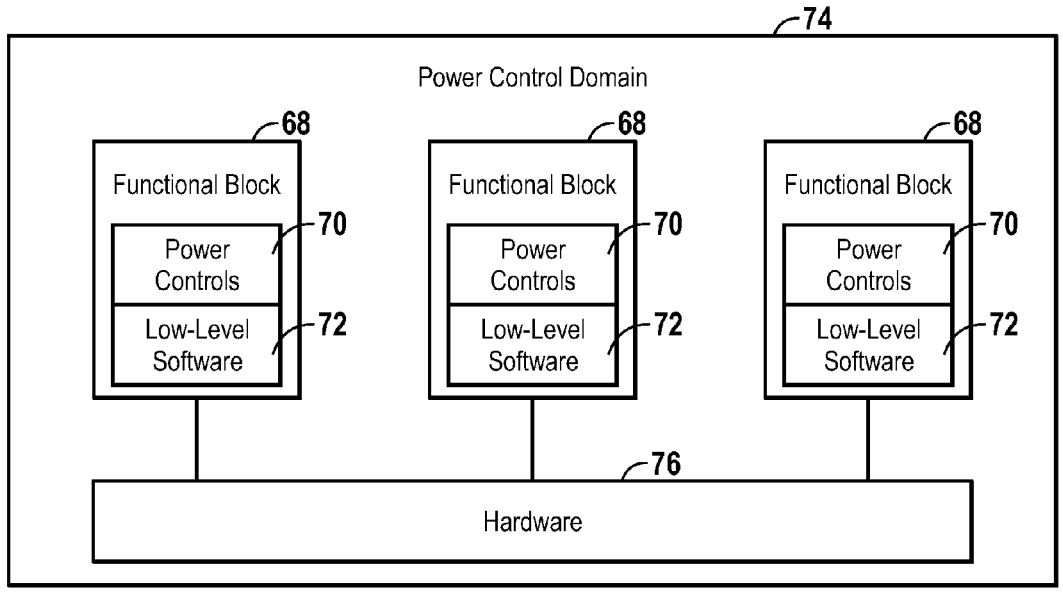
FIG. 6 is a block diagram depicting a hierarchy of components in accordance with an embodiment of the present disclosure.

These problems may be addressed by the presently disclosed techniques by eliminating the need for power control software to manage these coupling associations, as illustrated by FIG. 6. In the depicted embodiment, each functional block 68 may be independently controlled and contain a private set of power controls 70. In this embodiment, low-level software 72 may manipulate power controls 70 based on the local state of functional block 68. For each power control domain 74 in one such embodiment, hardware 76 may monitor power controls 70 of all of functional blocks 68 in power control domain 74 and may set the actual operating state of power control domain 74 to the lowest state allowed by functional blocks 68 in power control domain 74. For example, in one embodiment, hardware 76 may be configured based on how functional blocks 68 are distributed over power control domain 74 and, thus, may properly implement power management of power control domain 74. Hardware 76 may consist of an arrangement of OR, AND, NOR, and NAND gates or any other type of hardware logic gates. In addition, as will be appreciated by those skilled in the art, in different embodiments one or more power control domains 74 may be present.

Figure 7:
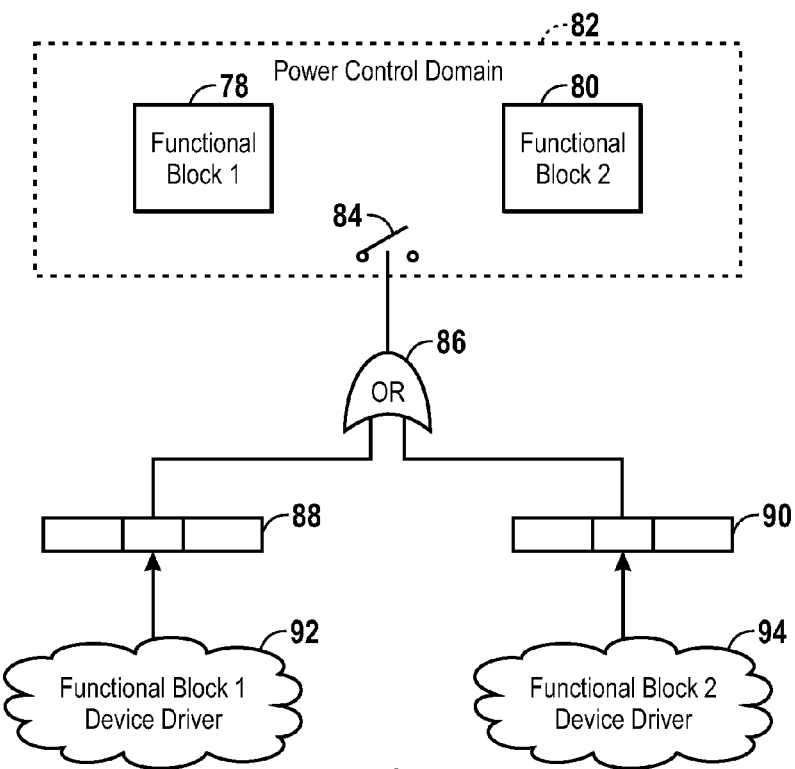
FIG. 7 is a diagram illustrating a system in accordance with an embodiment of the present disclosure.

FIG. 7 more particularly illustrates an exemplary embodiment of the present disclosure. As shown, a first and second functional block 78, 80 may be situated within a power control domain 82. Within power control domain 82, a power control switch 84 may be used to toggle the power on or off for power control domain 82. However, in the illustrated embodiment, an OR gate 86 may be used to cause the power to be toggled on for power control domain 82 if either first or second functional blocks 78, 80 need the power to be on. In the illustrated embodiment, a first and second physical power control register 88, 90 may be used as inputs to OR gate 86. If either first physical power control register 88 or second physical power control register 90 has a binary bit (e.g., corresponding to the power requirements of their respective functional block) set to an appropriate value, OR gate 86 may automatically toggle power control switch 84 to an ON state. Therefore, in this embodiment, hardware (e.g., OR gate 86) may be used to control the toggling of power control switch 84 for power control domain 82. A device driver 92 for first functional block 78 and a device driver 94 for second functional block 80 may both set the binary bit value for their respective physical power control registers 88, 90 based on whether their respective functional blocks currently require power, without regard to each other. However, the actual toggling of power on and off for power control domain 82 may be accomplished entirely through hardware (e.g., OR gate 86 and physical power control registers 88, 90), as opposed to software.

Figure 8A:
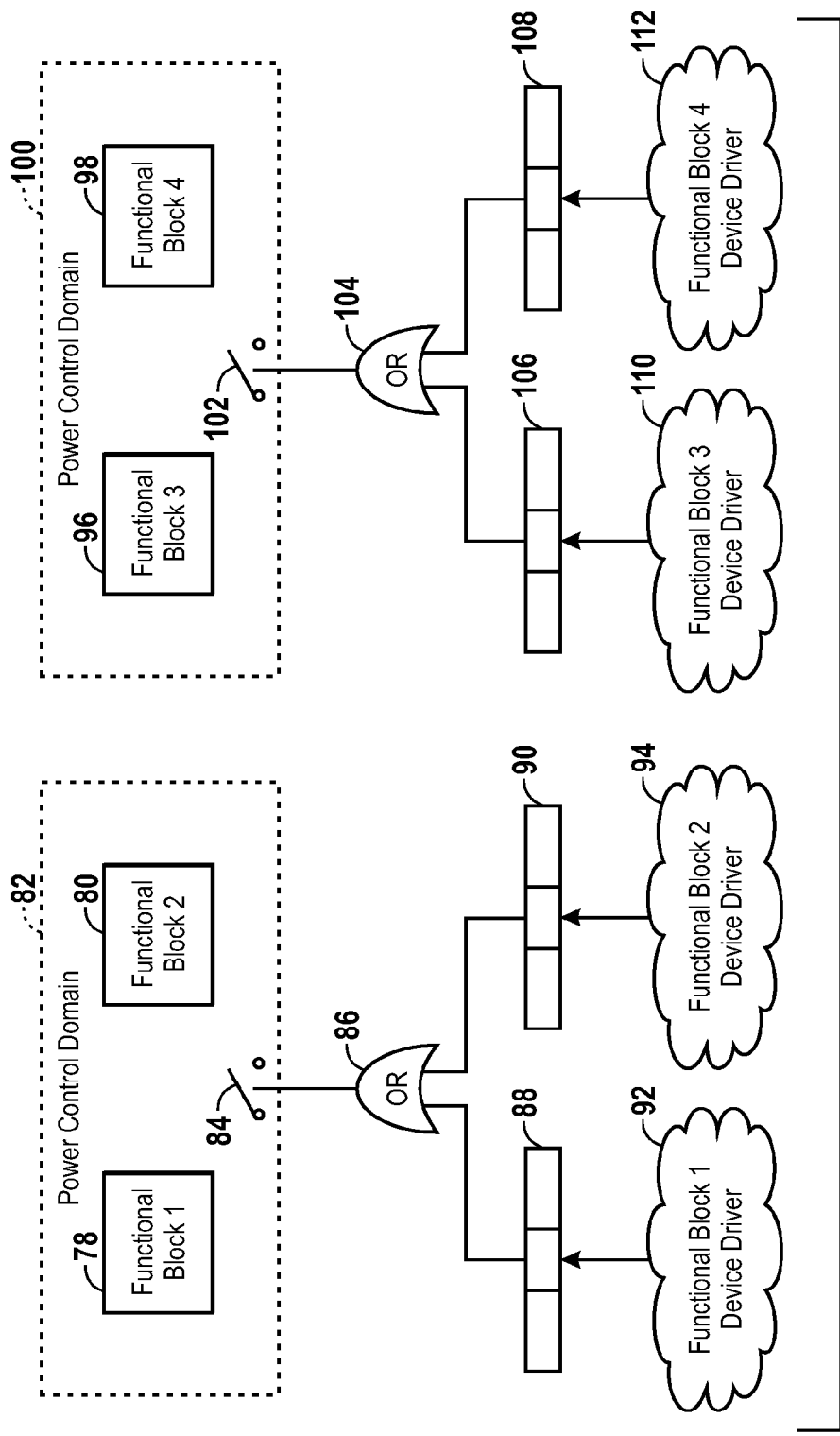
FIGS. 8A & 8B are diagrams illustrating a system in accordance with embodiments of the present disclosure.

Moreover, as functional blocks are moved from one power control domain to another, the physical hardware may be moved around accordingly based on implementation-specific considerations, but the software associated with each functional block may remain unchanged using the present techniques. For example, FIG. 8A illustrates the embodiment described above in FIG. 7. However, in FIG. 8A, a third and fourth functional block 96, 98 have been added which may be situated within a second power control domain 100. A second power control switch 102 may control whether power is on for second power control domain 100. In addition, a second OR gate 104 may be used to cause the power to be on or off for second power control domain 100. As before, a third and fourth physical power control register 106, 108 may be used as inputs to second OR gate 104. If either third physical power control register 106 or fourth physical power control register 108 has the appropriate binary bit set, second OR gate 104 may automatically toggle second power control switch 102 to an ON state. In such an implementation, a device driver 110 for third functional block 96 and a device driver 112 for fourth functional block 98 may set the appropriate binary bit value for their respective physical power control registers 106, 108 based on whether their respective functional blocks currently require power, without regard for each other. In fact, in one implementation, each of device drivers 92, 94, 110, and 112 may work without regard to the status of any of the functional blocks and device drivers.

Figure 8B:
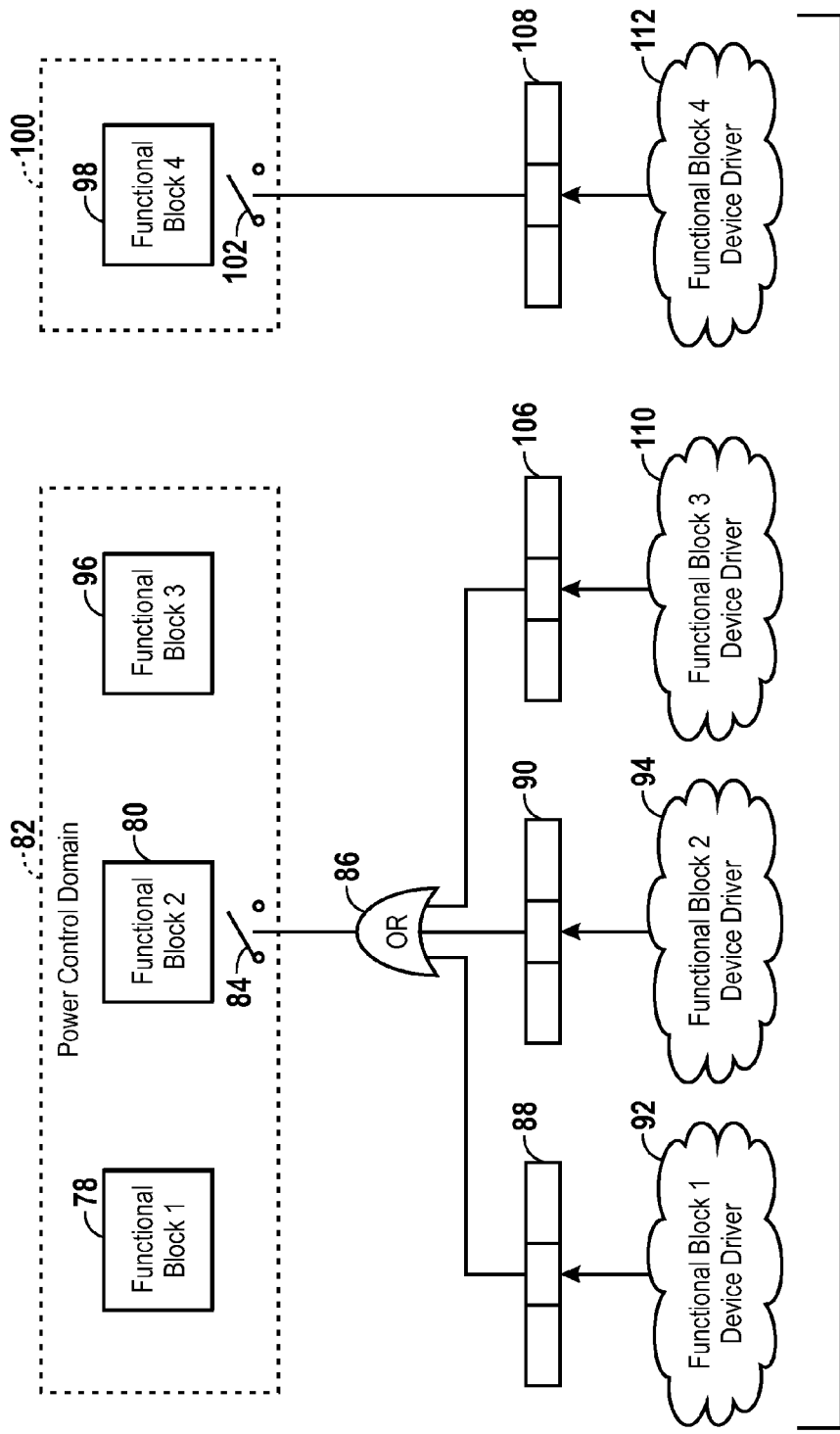

However, FIG. 8B illustrates what would happen if third functional block 96 were moved from second power control domain 100 to first power control domain 82. As illustrated, third physical power control register 106 may be moved to be an input into first OR gate 86 which may determine whether first power control switch 84 is toggled to an ON state. Thus, in this example, first power control switch 84, controlling the flow of power to first power control domain 82, may be toggled to an ON state if any of functional blocks 78, 80, or 96 need power and may be toggled to an OFF state if none of functional blocks 78, 80, and 96 need power. In addition, since only one functional block 98 may be used within second power control domain 100, there may no longer be a need for second OR gate 104, whereas fourth physical power control register 108 may directly control the toggling of second power control switch 102. However, device driver 110 for third functional block 96 may remain the same and may not need to be updated to take these hardware changes into consideration.

Figure 9:
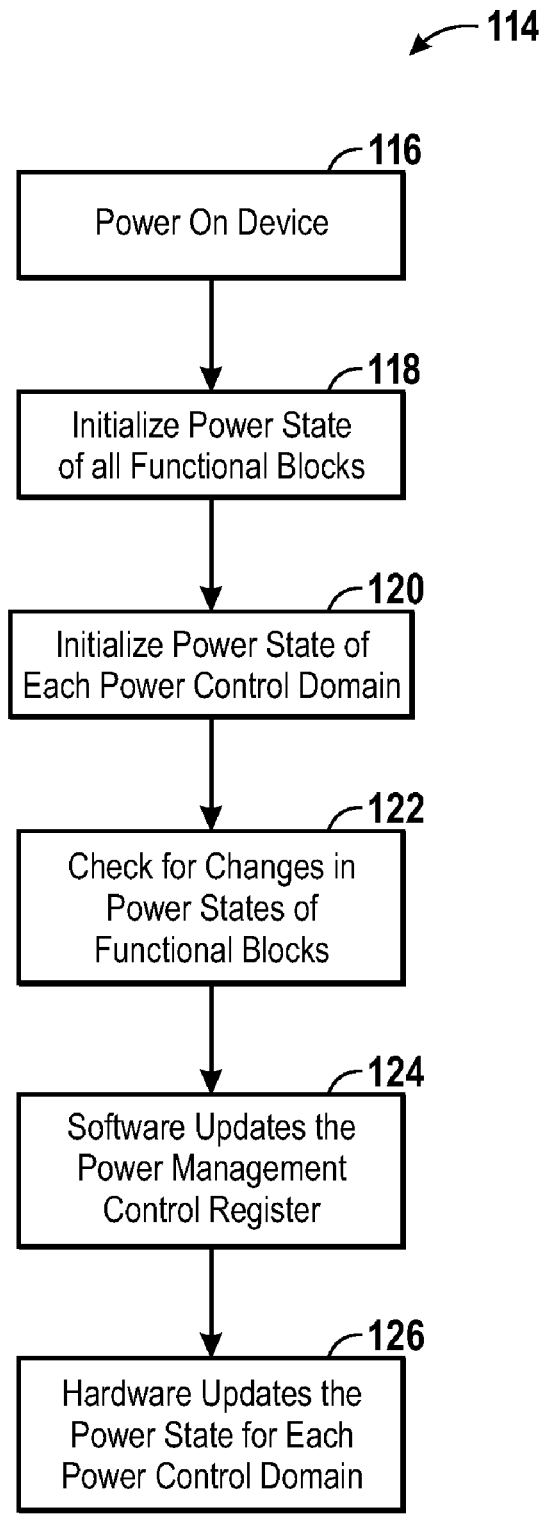
FIG. 9 is a flow chart of a method for updating power states in the system in accordance with one example of an embodiment of the present disclosure.

With the foregoing hardware descriptions in mind, FIG. 9 illustrates a process 114 for updating the power states of functional blocks in accordance with an embodiment of the present technique. Upon powering on (block 116) electronic device 10, hardware may initialize (block 118) the power state of all functional blocks to some default value, and then may initialize (block 120) the power state of each power control domain to the value implied by the power states of each of the functional blocks and by the physical assignment of the functional blocks to the power control domains. The number of power control domains and functional blocks within electronic device 10 may typically depend upon implementation-specific hardware considerations.

In one embodiment, low-level software within each functional block may continually check (block 122) for changes in the power state of its associated functional block. Whenever a change in power state is indicated, the low-level software may update (block 124) the power management control register based on these changed conditions. In one embodiment, the power management control register may be a hardware-based register. Any time the low-level software updates (block 124) the power management control register for some functional block, the hardware may automatically update (block 126) the actual operating power state of the power control domain to which the functional block is assigned.

The present techniques may address previous power coupling problems. First, since each functional block contains its own low-level software and power controls for independently controlling the local power state of the functional block, the scenarios illustrated in FIGS. 3A & 3B may be avoided. For example, in an exemplary embodiment, the low-level software may not inadvertently set the power state of one functional block based on the power state of another functional block. Further, using hardware to manage the coupling may cause the power state decisions to be based on the actual physical associations of the hardware configuration. Thus, in a hardware implementation, all management of this information at the software level may be eliminated as may be the need to synchronize scattered information in the low-level software based on implementation-specific hardware configurations. In fact, there may be no need for software to have any knowledge of the physical associations of hardware configurations.

Although the power controls of the functional blocks may operate in any manner, in certain embodiments the power controls of the functional blocks may have the same format and that format may be suitable for determining the lowest state allowed by the functional blocks. For example, if the power controls of all of the functional blocks in a power control domain are integers between 0 (the lowest state) and some maximum value (the highest state), then the lowest state allowed for the power control domain may be a simple MAX function of all the power controls of all of the functional blocks.

With the foregoing in mind, a more specific embodiment of the present technique is discussed which encompasses the concept of run levels. A "run level" is an abstract notion of a point in the power/performance space, ranging from the lowest possible power (power OFF) to the highest possible power (power ON, clocks at full speed). Table 1 shows example values for different run level power states. In one embodiment, software may determine the desired run level of each functional block on a local basis and may pass the result of this determination to hardware by setting the run level field of the device power management control register.

TABLE 1

Example Run Level Power States

| | |
|---|---|
| 0000 | OFF |
| 0001-0011 | Reserved for semi-OFF states |
| 0100 | Powered, all clocks stopped |
| 0101-1110 | Reserved for semi-stopped states |
| 1111 | Powered, all clocks at full speed |

Such an implementation, based on which functional blocks are actually in each clock and/or power partition, may evaluate the desired run level of all of the functional blocks in the partition and may manage power settings such that the clock and/or power system in the partition are set to the lowest allowable settings. In one embodiment, if an implementation has multiple functional blocks in a single clock and/or power partition, then all of the functional blocks may have their desired run level set to a particular state before the clock and/or power system in the partition is set to that state.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A system, comprising:
    a plurality of functional blocks, wherein each functional block contains software configured to set the power state for the functional block in a register associated with the functional block;
    at least one power control domain associated with a power control switch, wherein each functional block is associated with a respective power control domain; and hardware configured to set the power state of each power control domain by switching the power control switch associated with the power control domain based on the power states in the registers associated with the functional blocks within the respective power control domains.

2. The system of claim 1, wherein the power state of each power control domain is set to the highest power state required by the functional blocks within the respective power control domain.

3. The system of claim 1, wherein the power state of the functional blocks is an integer between a minimum power state and a maximum power state.

4. The system of claim 1, wherein the power state of the functional blocks is a function of performance required by the functional blocks.

5. The system of claim 1, wherein the hardware consists of an arrangement of logic gates.

6. A system, comprising:
    one or more partitions, each partition comprising one or more functional blocks, wherein each functional block has an associated run level that is set in a power management control register associated with the functional block by executable software routines; and
    hardware configured to set the run level of each partition by switching a power control switch associated with the partition based on the run levels indicated by the functional blocks within the respective partitions.

7. The system of claim 6, wherein a first partition is a clock partition.

8. The system of claim 6, wherein a first partition is a power partition.

9. The system of claim 6, wherein the run level for a given functional block is set based on a function of power and performance required by the functional block.

10. The system of claim 6, wherein the hardware comprises the power management control register.

11. An electronic device, comprising:
    a housing;
    a display disposed in the housing;
    a memory disposed in the housing, the memory including executable application instructions stored therein;
    a processor disposed in the housing and configured to execute the application instructions stored in the memory;
    at least one functional block comprising a device driver configured to set a local power state of the functional block in a register associated with the at least one functional block; and
    hardware configured to set at least one shared power state by switching a power control switch based on the local power states of the at least one functional block in the registers.

12. The electronic device of claim 11, further comprising at least one power control domain wherein each functional block is arranged within one of the power control domains.

13. The electronic device of claim 12, wherein the shared power states are operating power states of the power control domains.

14. The electronic device of claim 13, wherein the shared power state of each power control domain is set based on the local power states of only those functional blocks arranged within the power control domain.

15. A method for providing power to functional blocks, the method comprising:
    setting the power state for a plurality of functional blocks in registers associated with the functional blocks using software; and
    setting the power state for at least one power control domain by switching a power control switch associated with the at least one power control domain based on the power states for the plurality of functional blocks in the registers using hardware;
    wherein each of the functional blocks is associated with a respective power control domain.

16. The method of claim 15, wherein the power state for the power control domains is set based on the power states for the plurality of functional blocks associated with the respective power control domains.

17. The method of claim 15, wherein each of the functional blocks is associated with its own software.

18. The method of claim 15, wherein the power state of the functional blocks is an integer between a minimum power state and a maximum power state.

19. The method of claim 15, wherein the power state of the functional blocks is a function of the performance required of the functional blocks.

20. A method of manufacturing, comprising:
    providing an electronic device;
    providing software configured to set the local power state of at least one functional block used by the electronic device in a register associated with the at least one functional block; and
    providing hardware configured to set the operating power state of at least one power control domain by switching a power control switch associated with the at least one power control domain;
    wherein each of the at least one functional blocks is associated with a respective power control domain, and wherein the hardware is configured to set the operating power state of the at least one power control domain based on the local power states of the functional blocks arranged within each respective power control domain.

21. The method of claim 20, wherein each functional block is associated with its own software configured to set the local power state of the functional block.

22. The method of claim 20, wherein the hardware consists of an arrangement of logic gates.

* * * * *